(12) United States Patent
Bradwell et al.

(10) Patent No.: US 12,167,727 B1
(45) Date of Patent: Dec. 17, 2024

(54) TRAP

(71) Applicants: Arthur Randell Bradwell, Birmingham (GB); Robert Andrew Smith, Birmingham (GB); Dan Simmons, Birmingham (GB)

(72) Inventors: Arthur Randell Bradwell, Birmingham (GB); Robert Andrew Smith, Birmingham (GB); Dan Simmons, Birmingham (GB)

(*) Notice: Subject to any disclaimer, the term of this patent is extended or adjusted under 35 U.S.C. 154(b) by 0 days.

(21) Appl. No.: 18/238,274

(22) Filed: Aug. 25, 2023

(51) Int. Cl.
*A01M 23/24* (2006.01)
*A01K 5/02* (2006.01)
*A01M 23/16* (2006.01)

(52) U.S. Cl.
CPC ........... *A01M 23/24* (2013.01); *A01K 5/0225* (2013.01); *A01K 5/0291* (2013.01); *A01M 23/16* (2013.01)

(58) Field of Classification Search
CPC ...... A01M 23/24; A01M 23/16; A01M 23/20; A01M 23/22; A01M 23/04; A01M 23/12; A01M 23/14; A01K 5/0225; A01K 5/0291
USPC .......................................................... 43/77
See application file for complete search history.

(56) References Cited

U.S. PATENT DOCUMENTS

| | | | | |
|---|---|---|---|---|
| 3,423,870 A * | 1/1969 | Kost | ...................... | A01M 23/04 43/69 |
| 4,748,766 A | 6/1988 | Stimac | | |
| 4,876,821 A * | 10/1989 | Benzie | ................... | A01M 23/04 43/69 |
| 6,088,948 A * | 7/2000 | Per | ........................ | A01M 23/12 43/72 |
| 2009/0223112 A1 | 9/2009 | Deibert | | |
| 2011/0214337 A1 * | 9/2011 | Walter | ................... | A01M 23/16 43/58 |
| 2013/0232848 A1 * | 9/2013 | Ryan | ..................... | A01M 23/18 43/61 |
| 2014/0352199 A1 * | 12/2014 | Matney | ................. | A01M 23/04 43/61 |
| 2022/0039369 A1 * | 2/2022 | Shiels | .................... | A01M 23/16 |

FOREIGN PATENT DOCUMENTS

| | | |
|---|---|---|
| CN | 104302172 A | 1/2015 |
| JP | 2022169233 A | 11/2022 |
| WO | 2021133177 A1 | 7/2021 |

OTHER PUBLICATIONS

Search Report in corresponding application GB2203614.9 issued on Aug. 5, 2022.
Search Report in corresponding application GB2303658.5 issued on Jul. 26, 2023.

* cited by examiner

*Primary Examiner* — Joshua J Michener
*Assistant Examiner* — Nicole Paige MacCrate
(74) *Attorney, Agent, or Firm* — GORMAN IP LAW, APC; Susan W. Gorman

(57) ABSTRACT

The application provides a rodent or possum trap (101) comprising: a tunnel (102) for receiving a rodent or possum, a mechanical kill mechanism (103), the kill mechanism comprising, a spring-loaded strike edge (105) and optionally additionally comprises a mechanical trigger, and at least one trap door (104) having a closed position and an open position; wherein when the kill mechanism (103) is arranged so that when it is activated by a rodent in the tunnel (102) it kills the rodent and opens the trap door (104) to release the deceased rodent from the rodent trap.

18 Claims, 4 Drawing Sheets

TRAP

FIELD OF INVENTION

The present invention relates to a trap for grey squirrels, or other rodents or possums comprising a tunnel for receiving a rodent, a kill mechanism and at least one trap door having a closed position and an open position, and optionally a food reservoir.

BACKGROUND TO THE INVENTION

Grey squirrels (*Sciurus carolinensis*) cause an estimated annual damage of £40 million to British forestry by stripping bark from numerous species of tree including oak, beech, hornbeam and sycamore, as well as eating young saplings and leading stems. Grey squirrels are also known to damage roof spaces in houses and buildings by stripping insulation from electrical wires, contaminating water tanks and chewing on woodwork.

Commonly used techniques to control squirrel populations include drey-poking, shooting and trapping. However, there are several disadvantages associated with the traps that are currently available.

Single-catch, live-cage traps often catch other animals and birds when set for squirrels. Further, when animals, including squirrels, are caught in live-cage traps they can suffer stress and sustain injuries over a period of several hours. To minimise this suffering, it is a legal requirement in the UK that live-cage traps are inspected at least once a day. However, this daily inspection requires a full-time salary for at least one person throughout the trapping season for example at Norbury Park, Staffordshire, UK, which can typically run from February to July. This cost is in addition to the cost of the traps themselves.

Lethal spring or bolt-action traps, such as the Kania trap (Kania Industries Inc. Nanaimo, British Columbia, Canada), are designed to catch small pests such as grey squirrels, possums and rats. Spring traps are controlled by springs, which when triggered cause a bar to strike the neck of the animal, killing it instantly. This type of trap is generally more selective than live-cage traps, but they are still required to be checked at least daily to remove any trapped animals to prevent them being eaten or rotting in the trap. Accordingly, spring traps can have the same expense detailed above associated with them as the live-cage traps.

Therefore, there is a need to provide an improved trap, suitable for catching squirrels which is cheaper by not requiring daily inspection and easy to use.

Additionally, it should be resilient and typically not require complex electronics or an external power source which need weather proofing.

SUMMARY OF THE INVENTION

According to a first aspect of the invention, there is provided a rodent or possum trap comprising a tunnel for receiving an animal, a kill mechanism and at least one trap door having a closed position and an open position; wherein the kill mechanism is arranged so that when it is activated by an animal in the tunnel it kills the animal and opens the trap door to release the deceased animal from the trap.

The trap is particularly useful to trap grey squirrels.

As used herein the term "rodent" refers to mammals characterised by a single pair of continuously growing incisors in each of the upper and lower jaws.

Examples of rodents include, but are not limited to squirrels (especially grey squirrels), mice, rats, voles, beavers, marmots and gophers. Possums, such as common brushtail possum (*Trichosurus vulpecula*) are an agricultural and conservation pest in New Zealand where they were introduced from Australia.

Preferably, the tunnel comprises a first end and a second end, wherein an entrance or opening is located towards the first end and the kill mechanism is located towards the second end. The rodent may enter the trap at the first end of the tunnel and travel towards the kill mechanism.

The size of the tunnel is not particularly limited and can be varied depending on which animal the trap is intended to catch. If the animal is too large for which the trap is intended, it will be unable to enter the tunnel to trigger the kill mechanism. This provides a degree of selectivity over the animals that can gain access to the trap and subsequently be caught.

The kill mechanism may be arranged so that it is not triggered by smaller animals such as birds or small animals but by larger rodents or animals such as squirrels.

The material(s) of which the tunnel is made from is not particularly limited. Suitable materials include metal, plastic and wood.

The kill mechanism is preferably a mechanical mechanism, such as a spring-loaded mechanism. The kill mechanism may comprise a spring-loaded edge such as a strike bar and optionally additionally comprise a mechanical trigger. A wedge or blade may also be used as an edge to strike the animal.

That is, the kill mechanism does not typically comprise an electrical powered or gas powered kill mechanism, and typically not an electrical trigger.

In a preferred embodiment, the kill mechanism is a Kania trap comprising a trap body with a removeable side panel, a spring-loaded strike bar, a mechanical trigger and a setting arm, wherein the strike bar is located on the inside of the trap body and the setting arm is located on the outside of the trap body.

To set the Kania trap, the removeable side panel is removed and bait can be placed inside the trap body. The spring-loaded strike bar is pushed towards the back of the trap and held against the roof of the trap with a catch, hook or wire. The removeable side panel is then replaced on the trap body and the setting arm is moved from an unset position into a set position. The setting arm may be held in the set position with a hook or a catch.

When an animal enters the trap via the first end of the tunnel, it will contact the mechanical trigger which will cause the strike bar to be released. The released strike bar will move downwardly and strike the animal, preferably at the neck, killing the animal instantaneously. The released strike bar moves with significant force, providing a high degree of certainty in killing the animal entering the trap.

In tests by the inventors, the Kania trap had an almost 100% kill rate.

If the mechanism is accidently triggered so it does not strike an animal, the trapdoor is still opened, thereby allowing the release of any live animal within the trap.

Alternative triggers and kill mechanism may be used in the rodent or possum trap described herein.

Examples of alternative triggers include, but are not limited to, electric triggers, photoelectric triggers such as light beams or triggers powered by pressurised gas, such as pressurised carbon dioxide or air.

In an alternative embodiment, the kill mechanism may be powered by pressurised gas, such as pressurised carbon dioxide or air. When an animal enters the trap and travels towards the bait, a trigger is activated which causes the release of pressurised gas. This causes the strike bar to be released, which strikes the animal, killing it instantly. Examples of such traps are sold by Goodnature Traps Ltd, Inkpen, Berkshire, UK.

However, such mechanisms are typically not used as they require the pressurise gas to be recharged or a gas cylinder to be replaced or for a battery to be recharged or replaced.

In an alternative embodiment, the kill mechanism may comprise a photoelectric trigger, for example a light beam. The light beam may be for example a visible light beam, or an infrared light beam. When an animal enters the trap, it breaks the light beam which triggers the release of a strike bar that strikes the animal, killing it instantly.

When the kill mechanism is activated, the trap door opens from a closed position to an open position to release the deceased rodent or possum from the rodent trap. Once activated by the kill mechanism, the trap door is preferably opened by gravity.

Preferably, the trap door forms at least part of a floor of the tunnel. The trap door may form substantially all of the floor of the tunnel. The trap door may also extend beyond the tunnel area.

On release the deceased animal typically falls by the influence of gravity from the trap. The trap may be mounted on, for example a tree or a table with a suitable aperture through which the deceased animal falls. The deceased animal is typically then scavenged and removed by predators or other scavengers in the surrounding environment.

Preferably, the trap door is pivotally attached to the trap, for example with a hinge.

In a preferred embodiment, the trap door comprises a first part and a second part wherein the first part and the second part are pivotally attached to the trap. In alternative embodiments the trap door may comprise one part or more than two parts. There may be a delay between the timings of the release of the two or more trap doors. Preferably, in the embodiment using a spring and strike edge such as a strike bar, the tunnel entrance part of the trap door releases first which then releases the proximal trap door. The slight time delay ensures the spring hits the strike bar on the trap door in a locked position. Typically, the trap doors are attached via a chain or other connector. As the first part of the trap door falls it pulls the other down releasing the squirrel. The advantage of this is that there is a slight delay so that the spring falls on a completely fixed strike bar.

Preferably, a releasable closure is used for securing the trap door in the closed position. The releasable closure is located on a floor of the tunnel. The releasable closure may for example be a latch, a magnet, or an electronically controlled latch. The force of a killing arm striking the animal on the trap door may release the trapdoor from the releasable closure.

The releasable closure of the trap door may incorporate a delay between the triggering of the kill mechanism and the release of the trap door. The delay may be less than a second, such as ½ second. This may be achieved using for example an electronic delay to the closure but more typically a mechanical delay mechanism.

For example, the delay mechanism may comprise a bar having a first end and a second end. The first end may be attached to the trap via a hinge towards the first end of the trap. The second end comprises a pin attached to the second end via a chain or other connector. In the closed position, the bar is maintained, for example via friction with an edge of the trap or via a magnet, substantially parallel with the floor of the trap, with the pin holding the trapdoor in place. On release of the kill mechanism, the strike edge hits the second end of the bar causing it to fall about the hinged end. That in turn pulls taught the chain or other connector and pulls the pin out of the trap door, thereby allowing it to fall open.

In use, the axis of the tunnel, and typically the entire portion of the trap beyond the entrance of the tunnel to the second end of the trap, is preferably substantially horizontal or above horizontal in the direction of the kill mechanism from the entrance of the tunnel The angle above horizontal and be less than 35 or 30 degrees, or more typically 20 or 25 degrees. The trap may also be mounted on a surface such as a tree or the side of a building such that the trap is raised above the ground.

Accordingly, when the deceased rodent is released through the trap door, the deceased rodent falls to the ground underneath the trap, where it can be collected by an operator or taken away/eaten by other animals. Releasing the deceased rodents to the ground also provides food for other wildlife in the area.

Preferably, the trap further comprises a setting arm for resetting the trap door from the open position to the closed position. The setting arm may be the same setting arm that is used to set the killing mechanism, or a further setting arm may be provided. The setting arm is moved such that the trap door moves from the open position to the closed position, wherein it is releasably secured as described above.

Alternatively, the trap door may optionally be automatically reset from the open position to the closed position. This automatic reset mechanism may be powered electrically, for example by a battery and may also include a motor.

Alternatively, the automatic reset mechanism may be powered by pressurised gas, such as pressurised carbon dioxide or air. As described above, when a kill mechanism is powered by compressed gas, activation of a trigger causes pressurised gas to be released which causes a strike bar to strike the animal in the trap, killing it instantly. Following a decrease in gas pressure due to activation of the trigger, the strike bar and trigger move back to their starting positions, which permits the gas pressure to increase again, readying the trap to kill a further animal.

The trap more typically is manually reset.

Bait may be placed in the trap by hand, for example by removing the removeable door of the kill mechanism or by placing bait at the first end of the tunnel. Suitable baits may include, but are not limited to foods such as maize, nuts, seeds, meat, fish, fruit or vegetables or chemical baits such as rodenticides.

Preferably, the trap further comprises a bait dispenser, more preferably a timed bait dispenser. The bait may be delivered from the bait dispenser to the first end of the tunnel and/or the second end of the tunnel via a chute. The location of the bait dispenser is not particularly limited, but preferably the bait dispenser is located above the tunnel to allow a gravity feed of the food through the chute(s). Suitable bait dispensers include, for example timer fish food dispensers generally known in the art.

A timed bait dispenser advantageously allows the trap to be re-baited following the killing of an animal or in the event that bait is otherwise removed from the trap, for example stolen by an animal. The timed bait dispenser may be set to dispense bait at particular time intervals chosen by the operator.

That said such automated systems are complex. The inventors have unexpectedly found that it is possible to use a gravity fed dispenser towards the second end of the trap. Small birds or other animals can enter the tunnel without triggering the kill mechanism and access the bait. If the trap is raised above horizontal, then the bait is often dislodged towards the entrance of the tunnel and out of it. This means that a simple single gravity-based hopper may be used for the bait. A substantially horizontal area or porch may be provided before the entrance to the inclined tunnel to retain the bait in front of the tunnel and attract rodents or possums to enter the tunnel.

Preferably, the trap further comprises a window, such as a mesh window, at the second end of the tunnel, beyond the trigger mechanism. The mesh window allows the rodent or possum to view the bait located at the first end and/or the second end of the tunnel. However, the only way the rodent can access said bait is to enter the trap via the entrance towards the first end of the tunnel. Advantageously this means that the animal cannot access the bait without entering the trap, increasing the likelihood that an animal entering the trap will be killed.

A second aspect of the invention provides use of the trap of the present invention to catch squirrels. The trap may also be used to catch possums and rodents including, but not limited to rats, mice, voles, beavers, marmots and gophers. The trap may also be used to catch other small mammals such as martens or other mustelids.

BRIEF DESCRIPTION OF THE DRAWINGS

The invention will now be described in detail, by way of example only, with reference to the figures.

DESCRIPTION

The rodent or possum trap of the present invention is now described with reference to FIGS. 1, 2 and 3.

Figure 1:
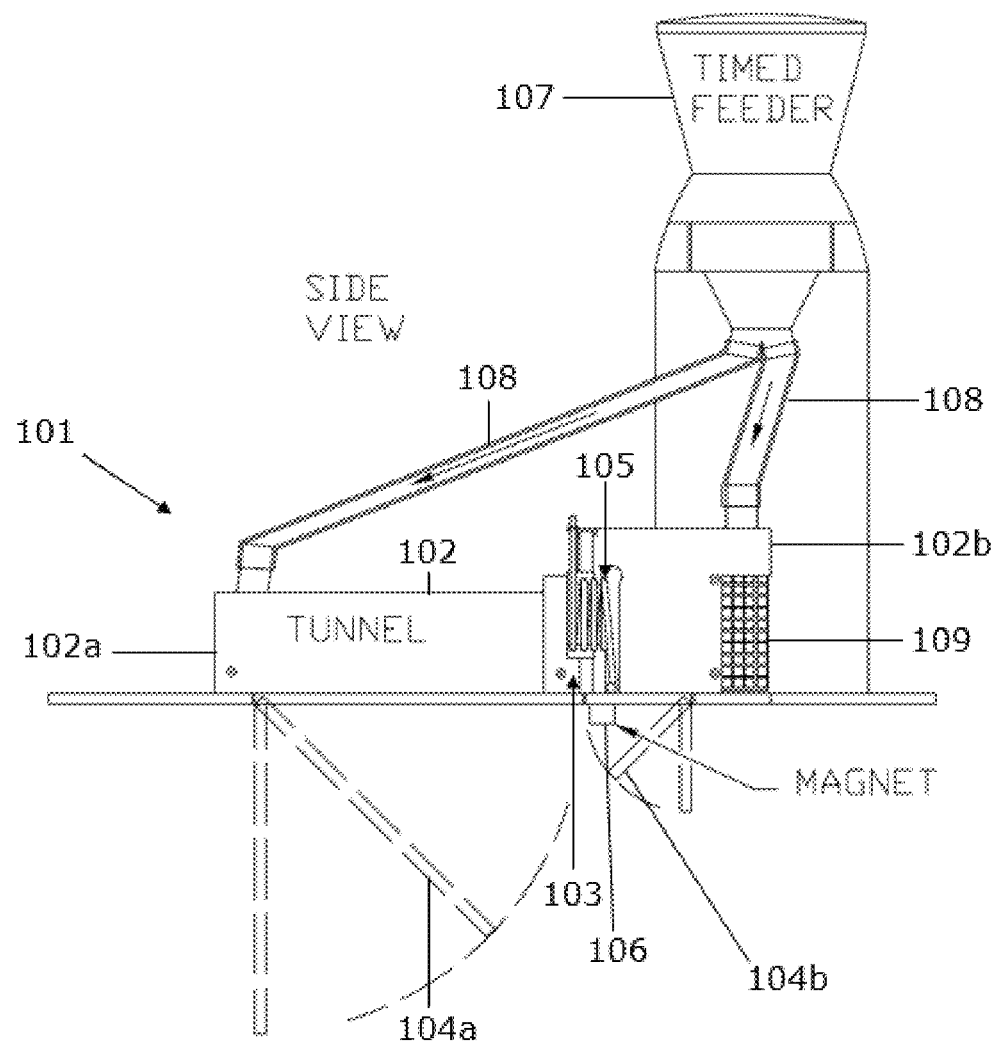
FIG. 1 shows a tunnel end view of the rodent or possum trap of the invention.
Figure 2:
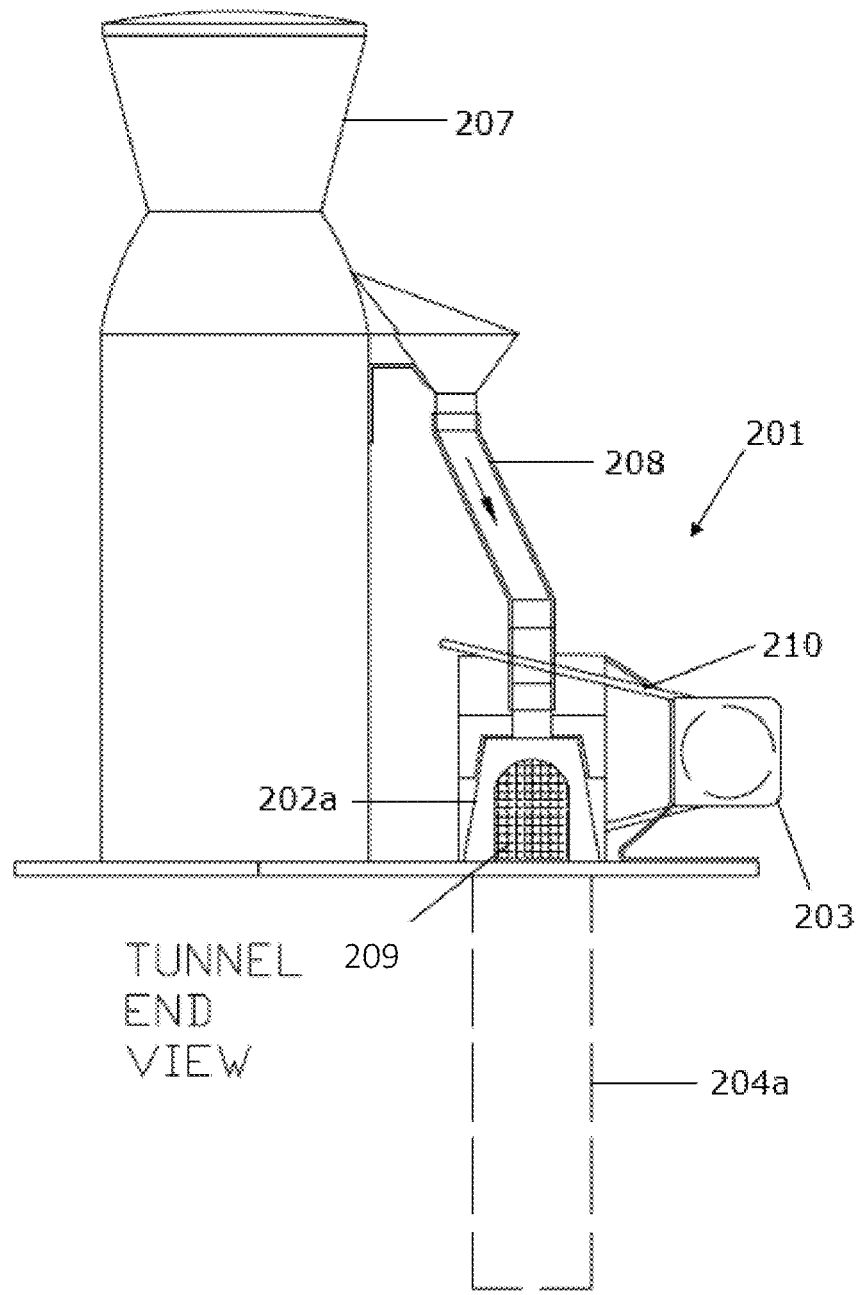
FIG. 2 shows a side view of the rodent or possum trap of FIG. 1.

FIG. 1 is a tunnel end view and FIG. 2 is a side view of the rodent or possum trap according to one embodiment of the present invention. FIG. 3 shows a photograph of a trap according to the invention mounted on a base.

As shown in FIGS. 1 and 2, the rodent or possum trap (101, 201) comprises a tunnel (102) which comprises a first end (102a, 202a) and a second end (102b). An entrance or opening is located towards the first end (102a, 202a) of the tunnel, which allows an animal to enter the trap.

A kill mechanism (103, 203) is located towards the second end (102b) of the tunnel (102). The kill mechanism (103, 203) is typically a Kania trap, comprising a spring-loaded strike bar (105) located on the inside of the trap and optionally additionally comprising a mechanical trigger. The kill mechanism also comprises a setting arm (210) located on the outside of the trap. When setting the trap, the setting arm (210) is moved from an unset position into a set position and may be held in the set position with a hook or a catch (not shown).

The trap door is located at a floor of the tunnel and forms at least part of a floor of the tunnel (102). The trap door is pivotally attached to the trap (101, 201).

The trap door comprises a first part (104a, 204a) and a second part (104b) wherein the first part and the second part are pivotally attached to the trap. The setting arm (210) may be used to reset the trap door from an open position to a closed position.

A releasable closure (106) for securing the trap door in the closed position is located at a floor of the tunnel. The releasable closure (106) is released by the activated kill mechanism (103).

A bait dispenser (107, 207) is located above the tunnel (102, 202) and bait can be delivered to the first end of the tunnel (102a, 202a) and/or the second end of the tunnel (102b) via a chute (108, 208) which connects the bait dispenser (107, 207) and the tunnel (102).

A mesh window (109, 209) is located at the second end of the tunnel (102b) to allow an animal to view any bait within the trap (101, 201).

Although a preferred embodiment has been described with reference to the accompanying drawings, it is apparent that details of construction, choice of materials and other unimportant aspects of the construction can be varied within the scope of the invention and the claims.

Figure 3:
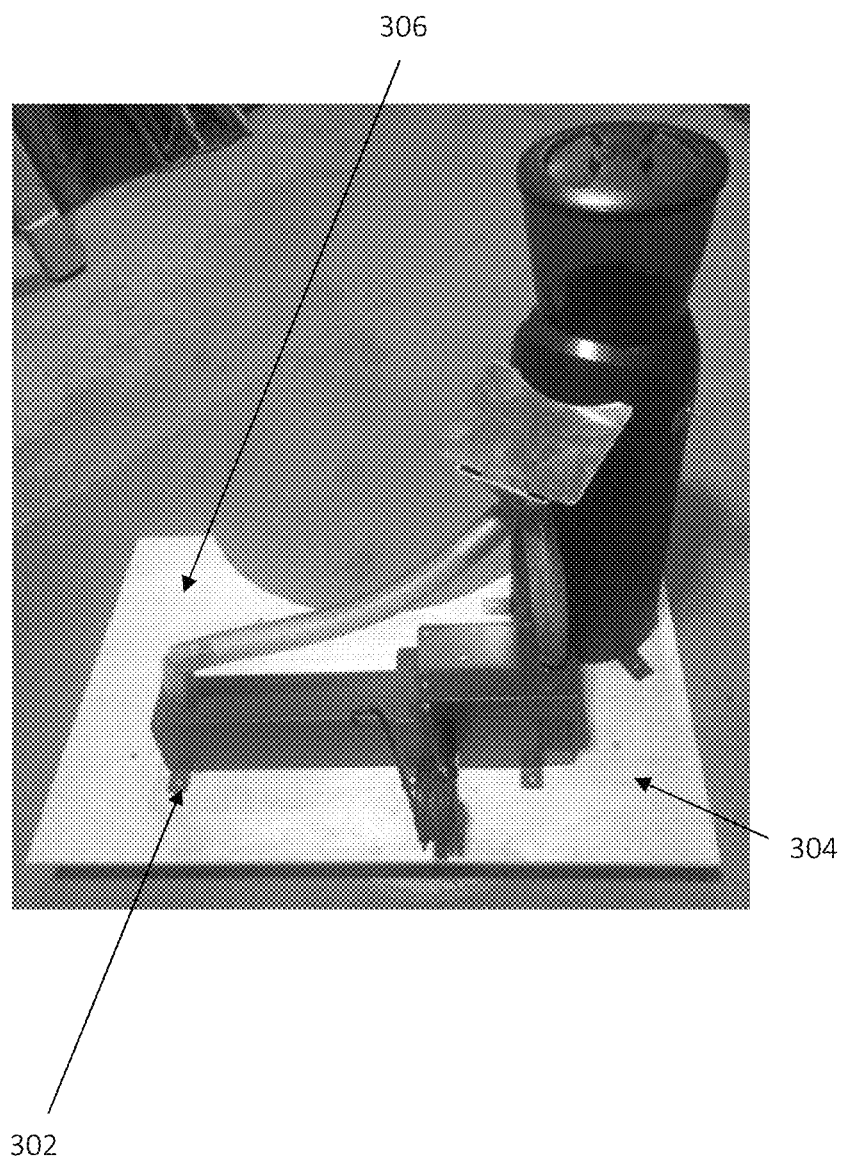
FIG. 3 shows a photograph of a trap according to the invention.

In FIG. 3 shows a preferred embodiment a trap (302) is mounted on a base (304) having an aperture below the trap through which a deceased animal may fall (not shown) via the trap door. A cut out is provided (306), which in use is placed against the trunk of a tree. The base may be held substantially horizontally by means of one or more legs below the base (304) which my rest on the ground or against the trunk of the tree. The base (304) may be held against the trunk by one or more straps or other fitments. The base may be made of any suitable material, including marine plywood.

Figure 4:
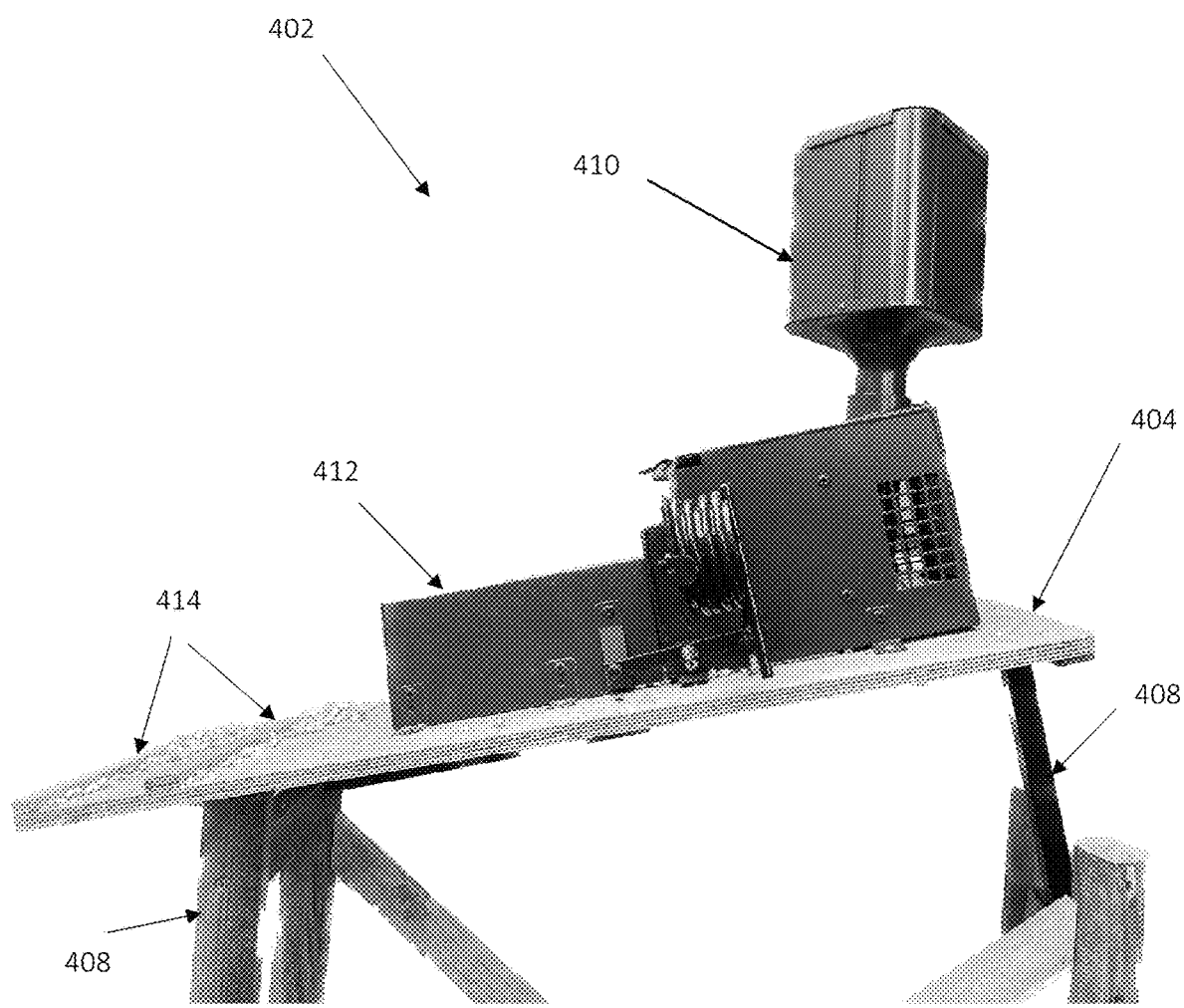
FIG. 4 shows an alternative arrangement of a trap according to the invention.

FIG. 4 shows an alternative embodiment in which a trap (402) is mounted on a inclined base (404), having an aperture below the trap through which a deceased animal may fall (not shown) via the trap door. A cut out may be provided (not shown), which in use is placed against the trunk of a tree. The base may be held substantially inclined by means of one or more legs (408) below the base (404) which my rest on the ground or against the trunk of the tree. The base (404) may be held against the trunk by one or more straps or other fitments. The base may be made of any suitable material, including marine plywood. In this embodiment a gravity fed hopper (410) may be provided. Bait may exit the trap (402), through tunnel (412). The bait may be retained on the base (404), by one or more ridges (414) on the base such as batons.

The invention claimed is:

1. A rodent or possum trap comprising
   a tunnel for receiving a rodent or possum;
   a mechanical kill mechanism, the kill mechanism comprising a spring-loaded strike edge and optionally additionally comprises a mechanical trigger;
   at least one trap door having a closed position and an open position; and
   a delayed releasable closure for securing the at least one trap door in the closed position until a predetermined time after the spring-loaded strike edge has struck the rodent or possum comprising a lever which is moveable between a closed position and an open position on being struck by a portion of the spring-loaded strike edge, and movement of the lever from the closed to the open position causes a retaining pin to be removed, thereby allowing the at least one trap door to open,
   wherein when the kill mechanism is arranged so that when it is activated by a rodent in the tunnel it kills the rodent and opens the at least one trap door to release the deceased rodent from the rodent trap.

2. The trap according to claim 1, further comprising a bait dispenser.

3. The trap according to claim 2, wherein the bait dispenser is a timed bait dispenser or a gravity fed bait dispenser.

4. The trap according to claim 2 wherein bait is delivered from the bait dispenser to the first end of the tunnel and/or the second end of the tunnel via a chute.

5. The trap according to claim 2 wherein the trap is mounted at up to 35 degrees to the horizontal and bait moves from the bait dispenser at the second end of the trap to the first end of the trap by gravity and/or dispersal by bird or mammals smaller than the rodent to be trapped, within the trap.

6. The trap according to claim 1, wherein the tunnel comprises a first end and a second end, wherein an entrance or opening is located towards the first end and the kill mechanism is located towards the second end.

7. The trap according to claim 1, wherein the at least one trap door forms at least part of a floor of the tunnel.

8. The trap according to claim 1, wherein the at least one trap door is pivotally attached to the trap.

9. The trap according to wherein the delayed release closure is released by activation of the kill mechanism, wherein the kill mechanism comprises a mechanical trigger.

10. The trap according to claim 1, wherein the delayed release closure is a latch or comprises a magnetic closure.

11. The trap according to claim 1, wherein once activated by the mechanical kill mechanism, the at least one trap door is opened by gravity.

12. The trap according to claim 1, wherein in use the axis of the tunnel is substantially horizontal or mounted at an angle of up to 35 degrees from the horizontal.

13. The trap according to claim 1, further comprising a setting arm for resetting the trap door from the open position to the closed position.

14. The trap according to claim 1, further comprising a mesh window at the second end of the tunnel.

15. A method of killing rodents and/or possums comprising engaging the spring-loaded strike edge of the kill mechanism of the trap according to claim 1, wherein activation of the kill mechanism kills the rodent and/or possum; and placing the trap at a distance above the ground, wherein the open position of the at least one trap door permits a killed rodent or possum to exit the trap.

16. A method of killing rodents and/or possums according to claim 15, wherein the trap is mounted on a tree.

17. A method of killing rodents and/or possums according to claim 16, wherein the rodent is a squirrel.

18. The method according to claim 15, wherein the rodent is a squirrel.

* * * * *